United States Patent
Khlat et al.

(10) Patent No.: US 10,554,232 B2
(45) Date of Patent: **\*Feb. 4, 2020**

(54) MULTI-BAND RADIO FREQUENCY FRONT-END CIRCUIT

(71) Applicant: Qorvo US, Inc., Greensboro, NC (US)

(72) Inventors: Nadim Khlat, Cugnaux (FR); Marcus Granger-Jones, Scotts Valley, CA (US)

(73) Assignee: Qorvo US, Inc., Greensboro, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/149,235

(22) Filed: Oct. 2, 2018

(65) Prior Publication Data

US 2019/0036555 A1    Jan. 31, 2019

Related U.S. Application Data (63) Continuation of application No. 15/799,052, filed on Oct. 31, 2017, now Pat. No. 10,148,294.

(Continued)

(51) Int. Cl.
*H04M 1/00* (2006.01)
*H04B 1/00* (2006.01)
(Continued)

(52) U.S. Cl.
CPC .......... *H04B 1/0064* (2013.01); *H01Q 1/243* (2013.01); *H01Q 1/523* (2013.01); *H01Q 1/525* (2013.01); *H01Q 5/50* (2015.01)

(58) Field of Classification Search
CPC ........ H04B 1/0064; H01Q 5/50; H01Q 1/243; H01Q 1/523
(Continued)

(56) References Cited

U.S. PATENT DOCUMENTS 8,314,653 B1 * 11/2012 Granger-Jones ........ H03F 1/223
                                                   327/552
8,682,260 B1 *  3/2014 Granger-Jones ..... H04B 1/0475
                                                   455/339

(Continued)

OTHER PUBLICATIONS

Notice of Allowance and Examiner Initiated Interview Summary for U.S. Appl. No. 15/799,052, dated Jul 30, 2018, 12 pages.

(Continued)

*Primary Examiner* — Edward F Urban
*Assistant Examiner* — Max Mathew
(74) *Attorney, Agent, or Firm* — Withrow & Terranova, P.L.L.C.

(57) ABSTRACT

Embodiments of the disclosure include a multi-band radio frequency (RF) front-end circuit. When a first antenna transmits an RF transmit signal in an RF transmit band, a second antenna may receive the RF transmit signal as an interference signal. The multi-band RF front-end circuit includes multiple receive filters for receiving an RF receive signal in multiple RF receive bands. A selected receive filter among the multiple receive filters is opportunistically reconfigured to help suppress the interference signal. Specifically, a bandpass bandwidth of the selected receive filter is expanded to include at least a portion of the RF spectrum of the interference signal. By doing so, it is possible to shunt the interference signal to a ground through the selected receive filter. As a result, it is possible to reduce an adverse impact of the interference signal to improve RF performance of the multi-band RF front-end circuit.

21 Claims, 6 Drawing Sheets

Related U.S. Application Data (60) Provisional application No. 62/430,715, filed on Dec. 6, 2016.

(51) Int. Cl.
 *H01Q 1/24* (2006.01)
 *H01Q 1/52* (2006.01)
 *H01Q 5/50* (2015.01)

(58) Field of Classification Search
 USPC ..... 455/78, 23, 552.1, 561, 73, 77; 375/297, 375/349
 See application file for complete search history.

(56) References Cited

U.S. PATENT DOCUMENTS

| | | | |
|---|---|---|---|
| 9,893,750 B2 | 2/2018 | Khlat et al. | |
| 9,985,667 B1* | 5/2018 | Ma | H04B 1/0475 |
| 10,009,052 B2 | 6/2018 | Khlat et al. | |
| 10,148,294 B2* | 12/2018 | Khlat | H01Q 1/525 |
| 2003/0153348 A1* | 8/2003 | Lahlum | H04B 1/406 |
| | | | 455/575.7 |
| 2009/0213770 A1* | 8/2009 | Mu | H04B 1/123 |
| | | | 370/281 |
| 2010/0048146 A1 | 2/2010 | McCallister | |
| 2011/0085477 A1* | 4/2011 | Schiff | H04B 7/15585 |
| | | | 370/279 |
| 2011/0227664 A1* | 9/2011 | Wyville | H03H 11/344 |
| | | | 333/17.1 |
| 2013/0176914 A1* | 7/2013 | Khlat | H04B 1/44 |
| | | | 370/278 |
| 2014/0348032 A1 | 11/2014 | Hua et al. | |
| 2015/0200437 A1 | 7/2015 | Solomko et al. | |
| 2015/0303981 A1 | 10/2015 | Sjoland et al. | |
| 2016/0094331 A1 | 3/2016 | White et al. | |
| 2016/0277046 A1 | 9/2016 | Pratt et al. | |
| 2017/0222672 A1 | 8/2017 | Khlat et al. | |
| 2018/0159564 A1 | 6/2018 | Khlat et al. | |

OTHER PUBLICATIONS

Non-Final Office Action for U.S. Appl. No. 15/420,369, dated Nov. 3, 2017, 7 pages.

Notice of Allowance for U.S. Appl. No. 15/420,369, dated Mar. 1, 2018, 12 pages.

* cited by examiner

MULTI-BAND RADIO FREQUENCY FRONT-END CIRCUIT

RELATED APPLICATIONS

This application is a continuation of U.S. patent application Ser. No. 15/799,052, filed on Oct. 31, 2017, now U.S. Pat. No. 10,148,294, which claims the benefit of provisional patent application Ser. No. 62/430,715, filed Dec. 6, 2016, the disclosures of which are hereby incorporated herein by reference in their entirety.

FIELD OF THE DISCLOSURE

The technology of the disclosure relates generally to radio frequency (RF) circuits supporting multiple RF bands.

BACKGROUND

Mobile communication devices have become increasingly common in current society for providing wireless communication services. The prevalence of these mobile communication devices is driven in part by the many functions that are now enabled on such devices. Increased processing capabilities in such devices means that mobile communication devices have evolved from being pure communication tools into sophisticated mobile multimedia centers that enable enhanced user experiences.

The redefined user experience requires higher data rates offered by wireless communication technologies, such as long-term evolution (LTE). Particularly in light of carrier aggregation (CA) schemes supported by modern cellular communications networks, a mobile communication device can be configured to simultaneously transmit an outgoing radio frequency (RF) signal(s) in multiple uplink frequency bands, while receiving an incoming RF signal(s) in multiple downlink frequency bands. The uplink and downlink frequency bands supported by a mobile communication device can be generally categorized based on respective frequency spectrums for easy reference. Some of the most commonly referenced frequency band categories include low-band (LB), mid-low-band (MLB), mid-band (MB), and high-band (HB). The LB, the MLB, the MB, and the HB categories typically refer to frequency spectrums between 450-960 MHz, 1452-1496 MHz, 1710-2200 MHz, and 2300-2700 MHz, respectively.

Support for the multiple frequency bands is provided by multiple radio front-ends, each supporting one or more frequency bands. Each radio front-end may include a multiplexer(s) (e.g., a diplexer for the dual-band scenario, a triplexer for a tri-band scenario, a quadplexer for a quad-band scenario, or a pentaplexer for a penta-band scenario) that can be selectively coupled to an antenna port(s). Furthermore, the mobile communication device may include multiple antennas, each coupled to a respective antenna port, to support multiple-input multiple-output (MIMO) and/or RF beamforming operations. In this regard, it may be desired to optimize configurations between the multiple radio front-ends and the multiple antennas to support flexible band combinations without compromising RF performance of the mobile communication device.

SUMMARY

Embodiments of the disclosure include a multi-band radio frequency (RF) front-end circuit. In a non-limiting example, the multi-band RF front-end circuit includes two antennas disposed in proximity. As such, when a first antenna transmits an RF transmit signal in an RF transmit band, the second antenna may receive the RF transmit signal as an interference signal in an RF spectrum corresponding to the RF transmit band. The multi-band RF front-end circuit includes multiple receive filters for receiving an RF receive signal in multiple RF receive bands. Given that not all of the multiple receive filters are used concurrently for receiving the RF receive signal, it is thus possible to opportunistically reconfigure a selected receive filter among the multiple receive filters to help suppress the interference signal. Specifically, a bandpass bandwidth of the selected receive filter is expanded to include at least a portion of the RF spectrum of the interference signal. By doing so, it is possible to shunt the interference signal to a ground through the selected receive filter. As a result, it is possible to reduce an adverse impact of the interference signal to improve RF performance of the multi-band RF front-end circuit.

In one aspect, a multi-band RF front-end circuit is provided. The multi-band RF front-end circuit includes a first antenna port coupled to a first antenna. The multi-band RF front-end circuit also includes a second antenna port coupled to a second antenna. The multi-band RF front-end circuit also includes first RF circuitry comprising a first transmit filter configured to pass an RF transmit signal in an RF transmit band. The multi-band RF front-end circuit also includes second RF circuitry comprising a plurality of receive filters configured to pass an RF receive signal in a plurality of RF receive bands. The multi-band RF front-end circuit also includes control circuitry. The control circuitry is configured to couple the first transmit filter to the first antenna port to transmit the RF transmit signal in the RF transmit band. The RF transmit signal transmitted from the first antenna port is presented at the second antenna port as an interference signal in the RF transmit band. The control circuitry is also configured to expand a bandpass bandwidth of a selected receive filter among the plurality of receive filters to include at least a portion of the RF transmit band. The control circuitry is also configured to couple the selected receive filter between the second antenna port and input impedance to form an interference signal path from the second antenna port to a ground. The control circuitry is also configured to adjust the input impedance to shunt the interference signal from the second antenna port to the ground.

In another aspect, a multi-band RF front-end circuit is provided. The multi-band RF front-end circuit includes a first antenna port coupled to a first antenna. The multi-band RF front-end circuit also includes a second antenna port coupled to a second antenna. The multi-band RF front-end circuit also includes first RF circuitry. The first RF circuitry includes a first transmit filter configured to pass an RF transmit signal in an RF transmit band. The first RF circuitry also includes a plurality of primary receive filters configured to pass the RF receive signal in one or more primary RF receive bands. The multi-band RF front-end circuit also includes second RF circuitry. The second RF circuitry includes a plurality of receive filters configured to pass an RF receive signal in a plurality of RF receive bands. The second RF circuitry also includes at least one second transmit filter configured to pass the RF transmit signal in a second RF transmit band different from the RF transmit band. The multi-band RF front-end circuit also includes control circuitry. The control circuitry is configured to couple the first transmit filter to the first antenna port to transmit the RF transmit signal in the RF transmit band. The RF transmit signal transmitted from the first antenna port is presented at the second antenna port as an interference signal in the RF transmit band. The control circuitry is also configured to expand a bandpass bandwidth of a selected receive filter among the plurality of receive filters to include at least a portion of the RF transmit band. The control circuitry is also configured to couple the selected receive filter between the second antenna port and input impedance to form an interference signal path from the second antenna port to a ground. The control circuitry is also configured to adjust the input impedance to shunt the interference signal from the second antenna port to the ground.

Those skilled in the art will appreciate the scope of the present disclosure and realize additional aspects thereof after reading the following detailed description of the preferred embodiments in association with the accompanying drawing figures.

BRIEF DESCRIPTION OF THE DRAWING FIGURES

The accompanying drawing figures incorporated in and forming a part of this specification illustrate several aspects of the disclosure and, together with the description, serve to explain the principles of the disclosure.

DETAILED DESCRIPTION

The embodiments set forth below represent the necessary information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure and the accompanying claims.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

It will be understood that when an element such as a layer, region, or substrate is referred to as being "on" or extending "onto" another element, it can be directly on or extend directly onto the other element or intervening elements may also be present. In contrast, when an element is referred to as being "directly on" or extending "directly onto" another element, there are no intervening elements present. Likewise, it will be understood that when an element such as a layer, region, or substrate is referred to as being "over" or extending "over" another element, it can be directly over or extend directly over the other element or intervening elements may also be present. In contrast, when an element is referred to as being "directly over" or extending "directly over" another element, there are no intervening elements present. It will also be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present.

Relative terms such as "below" or "above" or "upper" or "lower" or "horizontal" or "vertical" may be used herein to describe a relationship of one element, layer, or region to another element, layer, or region as illustrated in the Figures. It will be understood that these terms and those discussed above are intended to encompass different orientations of the device in addition to the orientation depicted in the Figures.

The terminology used herein is for the purpose of describing particular embodiments only and is not intended to be limiting of the disclosure. As used herein, the singular forms "a," "an," and "the" are intended to include the plural forms as well, unless the context clearly indicates otherwise. It will be further understood that the terms "comprises," "comprising," "includes," and/or "including" when used herein specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this disclosure belongs. It will be further understood that terms used herein should be interpreted as having a meaning that is consistent with their meaning in the context of this specification and the relevant art and will not be interpreted in an idealized or overly formal sense unless expressly so defined herein.

Embodiments of the disclosure include a multi-band radio frequency (RF) front-end circuit. In a non-limiting example, the multi-band RF front-end circuit includes two antennas disposed in proximity. As such, when a first antenna transmits an RF transmit signal in an RF transmit band, the second antenna may receive the RF transmit signal as an interference signal in an RF spectrum corresponding to the RF transmit band. The multi-band RF front-end circuit includes multiple receive filters for receiving an RF receive signal in multiple RF receive bands. Given that not all of the multiple receive filters are used concurrently for receiving the RF receive signal, it is thus possible to opportunistically reconfigure a selected receive filter among the multiple receive filters to help suppress the interference signal. Specifically, a bandpass bandwidth of the selected receive filter is expanded to include at least a portion of the RF spectrum of the interference signal. By doing so, it is possible to shunt the interference signal to a ground through the selected receive filter. As a result, it is possible to reduce adverse impact of the interference signal to improve RF performance of the multi-band RF front-end circuit.

Figure 1:
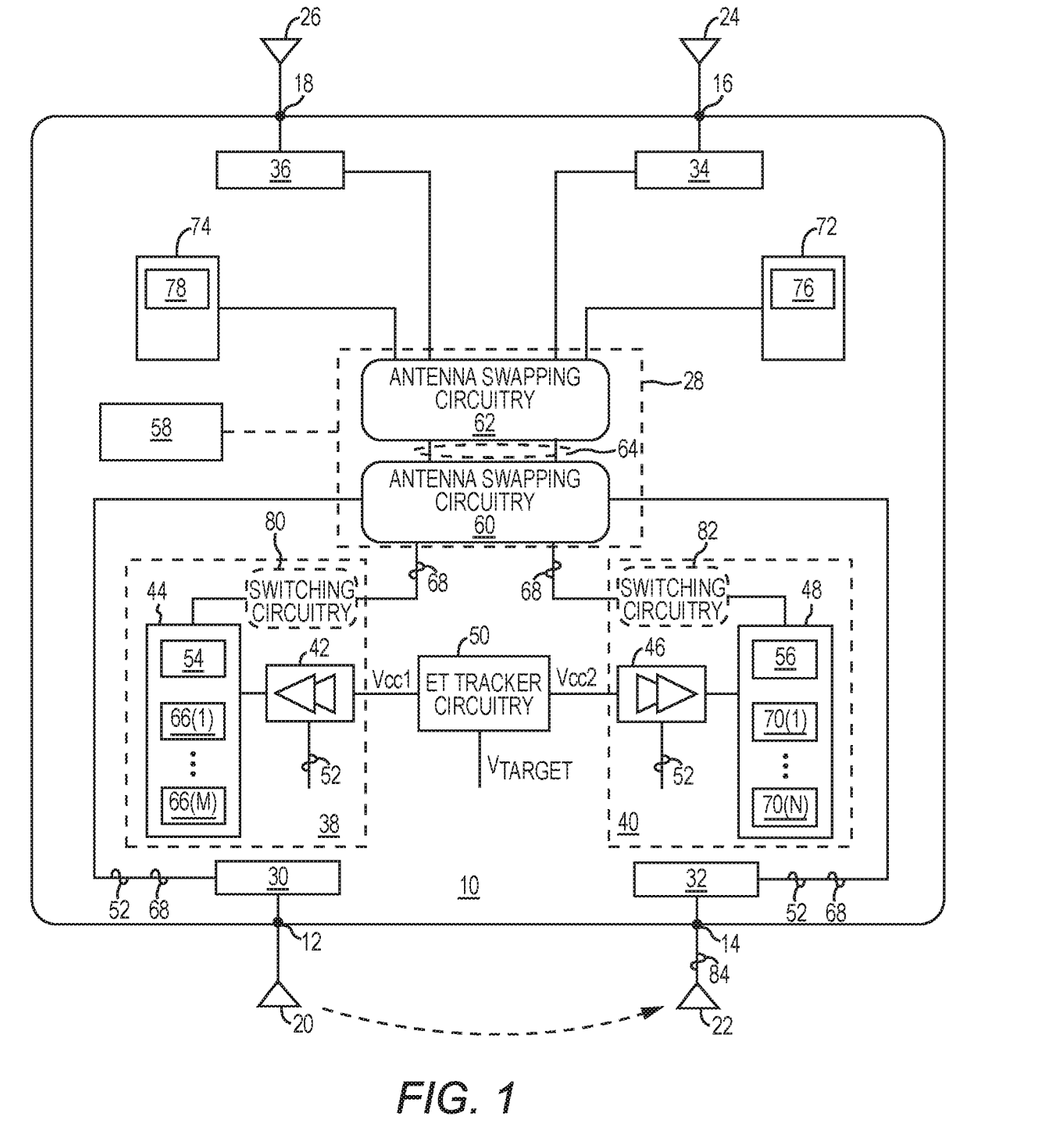
FIG. 1 is a schematic diagram of an exemplary multi-band radio frequency (RF) front-end circuit configured to support uplink carrier aggregation (ULCA) and multiple-input multiple-output (MIMO) in selected uplink and downlink frequency bands.

FIG. 1 is a schematic diagram of an exemplary multi-band RF circuit 10 configured to support uplink carrier aggregation (ULCA) and multiple-input multiple-output (MIMO) in selected uplink and downlink frequency bands. The multi-band RF circuit 10 includes a first antenna port 12, a second antenna port 14, a third antenna port 16, and a fourth antenna port 18 coupled to a first antenna 20, a second antenna 22, a third antenna 24, and a fourth antenna 26, respectively. In a non-limiting example, the first antenna 20 is a primary transmit and receive antenna. The second antenna 22 is a receive diversity antenna. The third antenna 24 and the fourth antenna 26 are MIMO receive antennas. Notably, the first antenna 20, the second antenna 22, the third antenna 24, and the fourth antenna 26 are provided and illustrated herein as non-limiting examples. It should be appreciated that the multi-band RF circuit 10 can be configured to include more or less than four antennas without affecting the operation principles discussed hereinafter.

The multi-band RF circuit 10 includes an antenna swapping circuit 28 coupled to the first antenna port 12, the second antenna port 14, the third antenna port 16, and the fourth antenna port 18. The multi-band RF circuit 10 may include first antenna multiplexer circuitry 30, second antenna multiplexer circuitry 32, third antenna multiplexer circuitry 34, and fourth antenna multiplexer circuitry 36 that are coupled to the first antenna port 12, the second antenna port 14, the third antenna port 16, and the fourth antenna port 18, respectively. In a non-limiting example, the antenna swapping circuit 28 is coupled to the first antenna port 12, the second antenna port 14, the third antenna port 16, and the fourth antenna port 18 via the first antenna multiplexer circuitry 30, the second antenna multiplexer circuitry 32, the third antenna multiplexer circuitry 34, and the fourth antenna multiplexer circuitry 36, respectively.

The multi-band RF circuit 10 includes first RF circuitry 38 and second RF circuitry 40. The first RF circuitry 38 and the second RF circuitry 40 are also provided in close proximity (e.g., ≤5 millimeters) from the first antenna port 12 and the second antenna port 14, respectively. The first RF circuitry 38 includes first amplifier circuitry 42 and first filter circuitry 44. The second RF circuitry 40 includes second amplifier circuitry 46 and second filter circuitry 48.

The multi-band RF circuit 10 includes envelope tracking (ET) tracker circuitry 50 configured to generate a first modulated voltage $V_{CC1}$ and a second modulated voltage $V_{CC2}$ based on at least one modulated target voltage $V_{TARGET}$. In a non-limiting example, the modulated voltage $V_{TARGET}$ can be an ET modulated target voltage. Accordingly, the first modulated voltage $V_{CC1}$ and/or the second modulated voltage $V_{CC2}$ can be an ET modulated voltage tracking the ET modulated target voltage. The ET tracker circuitry 50 is coupled to the first amplifier circuitry 42 and the second amplifier circuitry 46. In this regard, the ET tracker circuitry 50 provides the first modulated voltage $V_{CC1}$ and the second modulated voltage $V_{CC2}$ to the first amplifier circuitry 42 and the second amplifier circuitry 46, respectively.

The ET tracker circuitry 50 may be provided in proximity to the first RF circuitry 38 and the second RF circuitry 40.

As such, the ET tracker circuitry 50 can provide the first modulated voltage $V_{CC1}$ and the second modulated voltage $V_{CC2}$ to the first RF circuitry 38 and the second RF circuitry 40 via a relatively shorter wiring route. As a result, it may be possible to reduce distortion to the first modulated voltage $V_{CC1}$ and/or the second modulated voltage $V_{CC2}$.

The first amplifier circuitry 42 is configured to receive and amplify an RF transmit signal 52. The first filter circuitry 44 is coupled to the first amplifier circuitry 42 to receive the RF transmit signal 52. The first filter circuitry 44 includes at least one first RF transmit filter 54 configured to pass the RF transmit signal 52 in a first RF transmit band. The first transmit filter 54 may be configured to pass the RF transmit signal 52 in a mid-high (MH) frequency band that occupies an MH frequency spectrum between 1800 MHz (inclusive) and 2200 MHz (inclusive). In a non-limiting example, the MH frequency band can include long-term evolution (LTE) uplink band 1 (1920-1980 MHz) and LTE uplink band 25 (1850-1915 MHz).

The second amplifier circuitry 46 is configure to receive and amplify the RF transmit signal 52. The second filter circuitry 48 is coupled to the second amplifier circuitry 46 to receive the RF transmit signal 52. The second filter circuitry 48 includes at least one second RF transmit filter 56 configured to pass the RF transmit signal 52 in a second RF transmit band. The second transmit filter 56 may be configured to pass the RF transmit signal 52 in a mid-low (ML) frequency band that occupies an ML frequency spectrum between 1700 MHz (exclusive) and 1800 MHz (exclusive). In a non-limiting example, the ML frequency band can include LTE uplink band 3 (1710-1785 MHz), LTE uplink band 4 (1710-1755 MHz), and LTE uplink band 66 (1710-1780 MHz).

The multi-band RF circuit 10 includes control circuitry 58 that is coupled to the antenna swapping circuit 28. The control circuitry 58 may be enabled by a microprocessor, a microcontroller, or a field programmable gate array (FPGA). During the ULCA mode, the control circuitry 58 may couple the first transmit filter 54 to a first selected antenna port (e.g., the first antenna port 12) among the first antenna port 12, the second antenna port 14, the third antenna port 16, and the fourth antenna port 18 to transmit the RF transmit signal 52 in the first RF transmit band (e.g., LTE uplink band 1). Concurrently, the control circuitry 58 may couple the second transmit filter 56 to a second selected antenna port (e.g., the second antenna port 14) among the first antenna port 12, the second antenna port 14, the third antenna port 16, and the fourth antenna port 18 to transmit the RF transmit signal 52 in the second RF transmit band (e.g., LTE uplink band 3, LTE uplink band 4, and LTE uplink band 66).

In a non-limiting example, the antenna swapping circuit 28 can be configured to include first antenna swapping circuitry 60 and second antenna swapping circuitry 62. The first antenna swapping circuitry 60 and the second antenna swapping circuitry 62 can each include one or more switches that are controllable by the control circuitry 58. The first antenna swapping circuitry 60 is coupled to the second antenna swapping circuitry 62 by a coaxial cable pair 64. In one embodiment, the first antenna swapping circuitry 60 is coupled to the first antenna port 12, the second antenna port 14, the first filter circuitry 44, and the second filter circuitry 48, while the second antenna swapping circuitry 62 is coupled to the third antenna port 16 and the fourth antenna port 18.

The first antenna swapping circuitry 60 and the second antenna swapping circuitry 62 can enable flexible antenna coupling and signal routing in the multi-band RF circuit 10.

In one example, the control circuitry 58 can couple the first transmit filter 54 to the second antenna port 14 and/or couple the second transmit filter 56 to the first antenna port 12 via the first antenna swapping circuitry 60. In another example, the control circuitry 58 can couple the first transmit filter 54 and/or the second transmit filter 56 to the third antenna port 16 and/or the fourth antenna port 18 via the first antenna swapping circuitry 60 and the second antenna swapping circuitry 62.

In this regard, in the ULCA mode, the control circuitry 58 can flexibly couple the first transmit filter 54 and the second transmit filter 56 to any of the first antenna port 12, the second antenna port 14, the third antenna port 16, and the fourth antenna port 18 via the first antenna swapping circuitry 60 and the second antenna swapping circuitry 62. The control circuitry 58 may couple the first transmit filter 54 and the second transmit filter 56 to the first antenna port 12 and the second antenna port 14, respectively. The control circuitry 58 may couple the first transmit filter 54 and the second transmit filter 56 to the first antenna port 12 and the third antenna port 16, respectively. The control circuitry 58 may couple the first transmit filter 54 and the second transmit filter 56 to the first antenna port 12 and the fourth antenna port 18, respectively. The control circuitry 58 may couple the first transmit filter 54 and the second transmit filter 56 to the third antenna port 16 and the second antenna port 14, respectively. The control circuitry 58 may couple the first transmit filter 54 and the second transmit filter 56 to the fourth antenna port 18 and the second antenna port 14, respectively. Notably, it may be possible to support other antenna port coupling scenarios not explicitly mentioned above via the first antenna swapping circuitry 60 and the second antenna swapping circuitry 62.

The first filter circuitry 44 includes one or more first receive filters 66(1)-66(M) configured to pass an RF receive signal 68 in one or more first RF receive bands. In a non-limiting example, the first receive filters 66(1)-66(M) can include filters configured to pass the RF receive signal 68 in LTE downlink band 1 (2110-2170 MHz) and LTE downlink band 25 (1930-1995 MHz). Notably, other LTE downlink bands may also be supported by the first filter circuitry 44 by including appropriate receive filters among the first receive filters 66(1)-66(M).

The second filter circuitry 48 includes one or more second receive filters 70(1)-70(N) configured to pass the RF receive signal 68 in one or more second RF receive bands. In a non-limiting example, the second receive filters 70(1)-70(N) can include filters configured to pass the RF receive signal 68 in LTE downlink band 3 (1805-1880 MHz), LTE downlink band 4 (2110-2155 MHz), LTE downlink band 25 (1930-1995 MHz), LTE downlink band 30 (2350-2360 MHz), and LTE downlink band 66 (2110-2200 MHz). Notably, other LTE downlink bands may also be supported by the second filter circuitry 48 by including appropriate receive filters among the second receive filters 70(1)-70(N).

The multi-band RF circuit 10 may also include third filter circuitry 72 and fourth filter circuitry 74 that are coupled to the antenna swapping circuit 28. The third filter circuitry 72 includes at least one third receive filter 76 and the fourth filter circuitry 74 includes at least one fourth receive filter 78. In a non-limiting example, the third filter circuitry 72 can be configured to pass the RF receive signal 68 in LTE downlink band 25 (1930-1995 MHz) and LTE downlink band 30 (2350-2360 MHz) by providing appropriate receive filter(s) as the third receive filter 76. In another non-limiting example, the fourth filter circuitry 74 can be configured to pass the RF receive signal 68 in the LTE downlink band 25 (1930-1995 MHz) and the LTE downlink band 30 (2350-2360 MHz) by providing appropriate receive filter(s) as the fourth receive filter 78. Notably, the third filter circuitry 72 and the fourth filter circuitry 74 can be configured to support other LTE downlink bands as appropriate by including corresponding receive filters.

The control circuitry 58 can flexibly couple any of the first receive filters 66(1)-66(M), the second receive filters 70(1)-70(N), the third receive filter 76, and the fourth receive filter 78 to any of the first antenna port 12, the second antenna port 14, the third antenna port 16, and the fourth antenna port 18 to support MIMO mode operation concurrent to the ULCA mode operation. In one non-limiting example, the control circuitry 58 can couple any of the first receive filters 66(1)-66(M) to the first antenna port 12, the third antenna port 16, and the fourth antenna port 18 to receive the RF receive signal 68, while coupling the first transmit filter 54 and the second transmit filter 56 to the first antenna port 12 and the second antenna port 14 to transmit the RF transmit signal 52 in the first RF transmit band and the second RF transmit band, respectively. In another non-limiting example, the control circuitry 58 can couple any of the second receive filters 70(1)-70(N) to the second antenna port 14, the third antenna port 16, and the fourth antenna port 18 to receive the RF receive signal 68, while coupling the first transmit filter 54 and the second transmit filter 56 to the first antenna port 12 and the second antenna port 14 to transmit the RF transmit signal 52 in the first RT transmit band and the second RF transmit band, respectively.

The multi-band RF circuit 10 may include first switching circuitry 80 and second switching circuitry 82. The first switching circuitry 80 is coupled between the first filter circuitry 44 and the antenna swapping circuit 28. The second switching circuitry 82 is coupled between the second filter circuitry 48 and the antenna swapping circuit 28. Each of the first switching circuitry 80 and the second switching circuitry 82 includes one or more switches that are controlled by the control circuitry 58. Thus, by opening and/or closing appropriate switches in the first switching circuitry 80, the control circuitry 58 can flexibly couple the first transmit filter 54 and any of the first receive filters 66(1)-66(M) to the antenna swapping circuit 28 to support concurrent ULCA and MIMO operations.

Likewise, by opening and/or closing appropriate switches in the second switching circuitry 82, the control circuitry 58 can flexibly couple the second transmit filter 56 and any of the second receive filters 70(1)-70(N) to the antenna swapping circuit 28 to support concurrent ULCA and MIMO operations.

When the first antenna 20 and the second antenna 22 are transmitting concurrently in the LTE uplink band 1 and LTE uplink band 3, for example, during the ULCA operation, RF interference may occur between the first antenna 20 and the second antenna 22 due to antenna coupling. For example, the RF transmit signal 52 transmitted from the first antenna port 12 in the first RF transmit band (e.g., LTE uplink band 1 between 1920-1980 MHz or LTE uplink band 25 between 1850-1915 MHz) can present at the second antenna port 14 as an interference signal 84 in a frequency spectrum of the first RF transmit band (e.g., LTE uplink band 1 between 1920-1980 MHz or LTE uplink band 25 between 1850-1915 MHz). The interference signal 84 may change a frequency response and/or antenna loading of the second antenna 22. As a result, the second antenna 22 may be desensitized and unable to receive the RF receive signal in the RF receive bands (e.g., LTE downlink band 3, LTE downlink band 4, and LTE downlink band 66). Further, given that the first antenna 20 and the second antenna 22 may be provided in close proximity in a smartphone form factor, it may be difficult to provide sufficient spatial separation between the first antenna 20 and the second antenna 22 to reject the interference signal 84. Hence, it may be desirable to assist the second antenna 22 to reject the interference signal 84.

Figure 2:
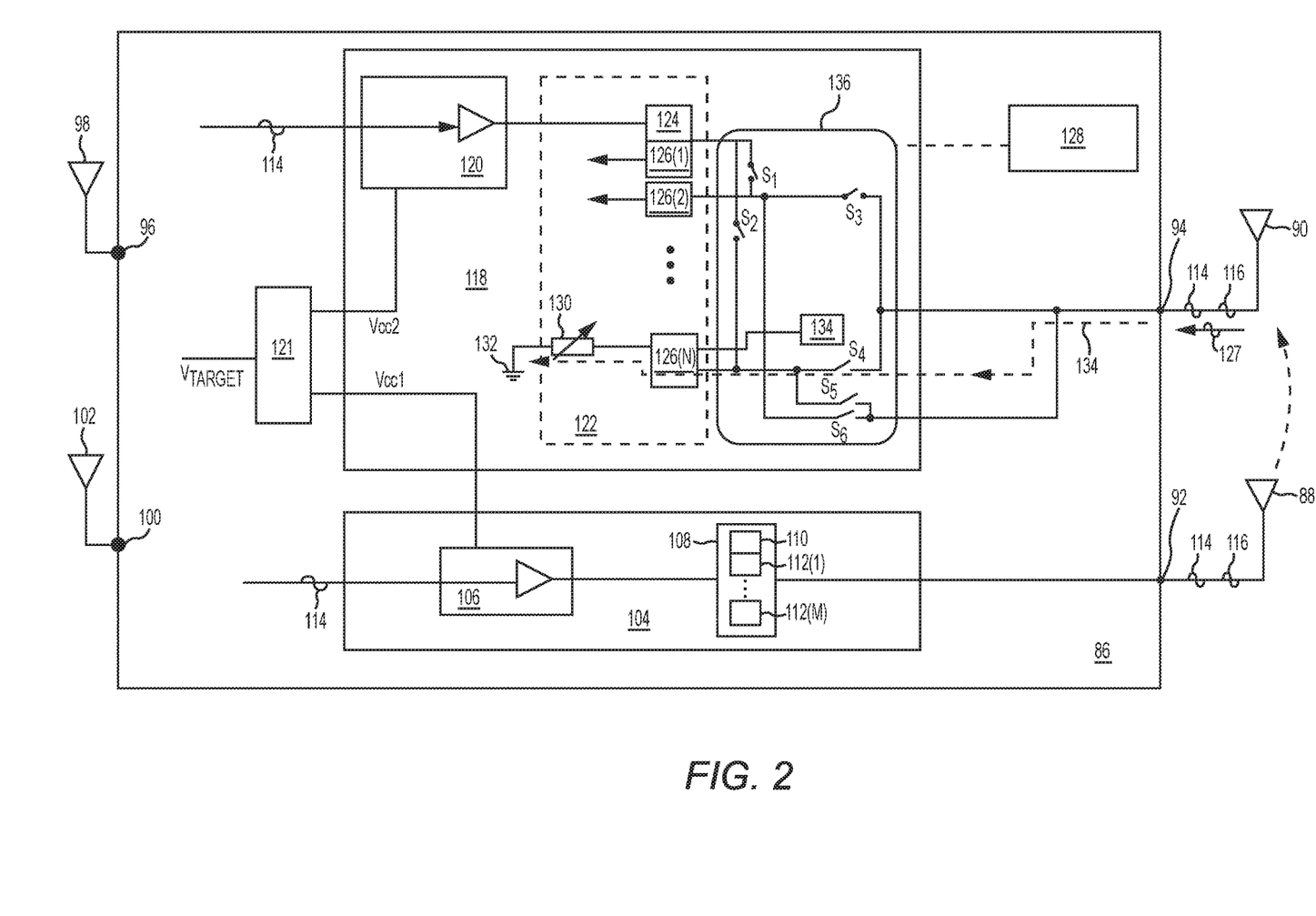
FIG. 2 is a schematic diagram of an exemplary multi-band RF front-end circuit configured to improve RF isolation between a first antenna and a second antenna located in proximity.

In this regard, FIG. 2 is a schematic diagram of an exemplary multi-band RF front-end circuit 86 configured to improve RF isolation between a first antenna 88 and a second antenna 90 located in proximity. The multi-band RF front-end circuit 86 includes a first antenna port 92 coupled to the first antenna 88 and a second antenna port 94 coupled to the second antenna 90. The multi-band RF front-end circuit 86 may include a third antenna port 96 coupled to a third antenna 98 and a fourth antenna port 100 coupled to a fourth antenna 102. Notably, the multi-band RF front-end circuit 86 may include more than the first antenna port 92, the second antenna port 94, the third antenna port 96, and the fourth antenna port 100. In a non-limiting example, the first antenna port 92, the second antenna port 94, the third antenna port 96, and the fourth antenna port 100 are functionally equivalent to the first antenna port 12, the second antenna port 14, the third antenna port 16, and the fourth antenna port 18 of FIG. 1, respectively. Like the multi-band RF circuit 10 of FIG. 1, the multi-band RF front-end circuit 86 is configured to support ULCA and MIMO operations in a variety of RF transmit and/or receive band combinations.

The multi-band RF front-end circuit 86 includes first RF circuitry 104 coupled to the first antenna port 92. The first RF circuitry 104 includes first amplifier circuitry 106 and first filter circuitry 108. In a non-limiting example, the first RF circuitry 104, the first amplifier circuitry 106, and the first filter circuitry 108 are functionally equivalent to the first RF circuitry 38, the first amplifier circuitry 42, and the first filter circuitry 44 of FIG. 1, respectively. The first filter circuitry 108 includes at least one first transmit filter 110 and one or more primary receive filters 112(1)-112(M). In a non-limiting example, the first transmit filter 110 is functionally equivalent to the first transmit filter 54 of FIG. 1 and the primary receive filters 112(1)-112(M) are functionally equivalent to the first receive filters 66(1)-66(M) of FIG. 1. The first transmit filter 110 is configured to pass an RF transmit signal 114 in an RF transmit band (e.g., LTE uplink band 1 and LTE uplink band 25) to the first antenna port 92 for transmission via the first antenna 88. The primary receive filters 112(1)-112(M) are configured to pass an RF receive signal 116, which is received via the first antenna 88 and the first antenna port 92, in one or more primary RF receive bands (e.g., LTE downlink band 1 and LTE downlink band 25).

The multi-band RF front-end circuit 86 includes second RF circuitry 118 coupled to the second antenna port 94. The second RF circuitry 118 includes second amplifier circuitry 120 and second filter circuitry 122. In a non-limiting example, the second amplifier circuitry 120 is functionally equivalent to the second amplifier circuitry 46 of FIG. 1. The multi-band RF front-end circuit 86 includes ET tracker circuitry 121, which generates a first modulated voltage $V_{CC1}$ and a second modulated voltage $V_{CC2}$ based on at least one modulated target voltage $V_{TARGET}$. In a non-limiting example, the modulated voltage $V_{TARGET}$ can be an ET modulated target voltage. Accordingly, the first modulated voltage $V_{CC1}$ and/or the second modulated voltage $V_{CC2}$ can be an ET modulated voltage tracking the ET modulated target voltage. The ET tracker circuitry 121 is coupled to the first amplifier circuitry 106 and the second amplifier circuitry 120. In this regard, the ET tracker circuitry 121 provides the first modulated voltage $V_{CC1}$ and the second modulated voltage $V_{CC2}$ to the first amplifier circuitry 106 and the second amplifier circuitry 120, respectively.

The second filter circuitry 122 includes at least one second transmit filter 124 and a plurality of receive filters 126(1)-126(N). In a non-limiting example, the second transmit filter 124 is functionally equivalent to the second transmit filter 56 of FIG. 1 and the receive filters 126(1)-126(N) are functionally equivalent to the second receive filters 70(1)-70(N) of FIG. 1. The second transmit filter 124 is configured to pass the RF transmit signal 114 in a second RF transmit band (e.g., LTE uplink band 3, LTE uplink band 4, and LTE uplink band 66) to the second antenna port 94 for transmission via the second antenna 90. In this regard, the second RF transmit band may be adjacent to, but not overlapping with the first RF transmit band. The receive filters 126(1)-126(N) are configured to pass the RF receive signal 116, which is received via the second antenna 90 and the second antenna port 94, in a plurality of RF receive bands (e.g., LTE downlink band 1, LTE downlink band 3, LTE downlink band 4, LTE downlink band 25, and LTE downlink band 66).

Notably, the first antenna 88 and the second antenna 90 are provided in proximity in an electronic device such as a smartphone. As such, there may not be sufficient spatial separation between the first antenna 88 and the second antenna 90. As a result, the RF transmit signal 114 transmitted from the first antenna 88 in the RF transmit band may be received by the second antenna 90 and presented to the second antenna port 94 as an interference signal 127 in an RF spectrum corresponding to the RF transmit band.

For example, the RF transmit signal 114 transmitted from the first antenna 88 in the LTE uplink band 1 (1920-1980 MHz) can be received by the second antenna 90 and presented to the second antenna port 94 as the interference signal 127 in the RF spectrum of 1920-1980 MHz. Likewise, the RF transmit signal 114 transmitted from the first antenna 88 in the LTE uplink band 25 (1850-1915 MHz) can be received by the second antenna 90 and presented to the second antenna port 94 as the interference signal 127 in the RF spectrum of 1850-1915 MHz.

Presence of the interference signal 127 at the second antenna port 94 may change the antenna loading and frequency response of the second antenna 90. As a result, the second antenna 90 may be desensitized in the RF receive bands (e.g., LTE downlink band 3, LTE downlink band 4, and LTE downlink band 66), thus compromising RF performance of the RF receive filters 126(1)-126(N) and the multi-band RF front-end circuit 86 as a whole.

As explained in detail below, any unused receiver filter among the receive filters 126(1)-126(N) may be reconfigured, either dynamically or statically, to form a low impedance path to remove the interference signal 127, thus helping to improve RF isolation between the first antenna 88 and the second antenna 90. In examples discussed herein, the unused receive filter can be any receive filter in the second filter circuitry 122 that is not used to receive the RF receive signal 116. A bandpass bandwidth of the unused receive filter can then be expanded to include at least a portion of the RF spectrum of the interference signal 127 to help suppress the interference signal 127 at the second antenna port 94.

The multi-band RF front-end circuit 86 includes control circuitry 128, which can be provided as a microprocessor, or a FPGA. The control circuitry 128 has all the capabilities of the control circuitry 58 of FIG. 1. The control circuitry 128 can couple the first transmit filter 110 to the first antenna port 92 to transmit the RF transmit signal 114 in the RF transmit band (e.g., LTE uplink band 1 and LTE uplink band 25). In addition, the control circuitry 128 is configured to expand a bandpass bandwidth of a selected receive filter (e.g., the receive filter 126(N)) among the receive filters 126(1)-126(N) to include at least a portion of the RF transmit band. In a non-limiting example, the selected receive filter is an unused receive filter not used to receive the RF receive signal 116. The control circuitry 128 couples the selected receive filter between the second antenna port 94 and an input impedance 130, which is coupled to a ground 132, to form an interference signal path 134 from the second antenna port 94 to the ground 132. The control circuitry 128 may close or open the interference signal path 134 by adjusting the input impedance 130. For example, the control circuitry 128 can reduce the input impedance 130 to below a predefined low impedance threshold to make the interference signal path 134 a closed path, thus allowing the interference signal 127 to be shunted to the ground 132 through the selected receive filter. In contrast, the control circuitry 128 may increase the input impedance 130 to above a predefined high impedance threshold to make the interference signal path 134 an open path, thus not allowing the interference signal 127 to be shunted to the ground 132 through the selected receiver filter. As further illustrated in FIGS. 3A and 3B below, the control circuitry 128 can close the interference signal path 134 when the selected receive filter is not used to receive the RF receive signal 116 in one of the RF receive bands. In contrast, the control circuitry 128 can open the interference signal path 134 when the selected receive filter is used to receive the RF receive signal 116 in one of the RF receive bands.

The multi-band RF front-end circuit 86 may include switching circuitry 136, which is provided between the second filter circuitry 122 and the second antenna port 94. The switching circuitry 136 includes switches $S_1$-$S_6$, which the control circuitry 128 can control to selectively couple the second transmit filter 124 and any of the receive filters 126(1)-126(N) to the second antenna port 94. The control circuitry 128 can also control the switching circuitry 136 to couple the selected receive filter to the second antenna port 94. It should be appreciated that the switching circuitry 136 may be constructed based on any number, type, and layout of the switches without limiting and/or affecting functionality of the switching circuitry 136.

Figure 3A:
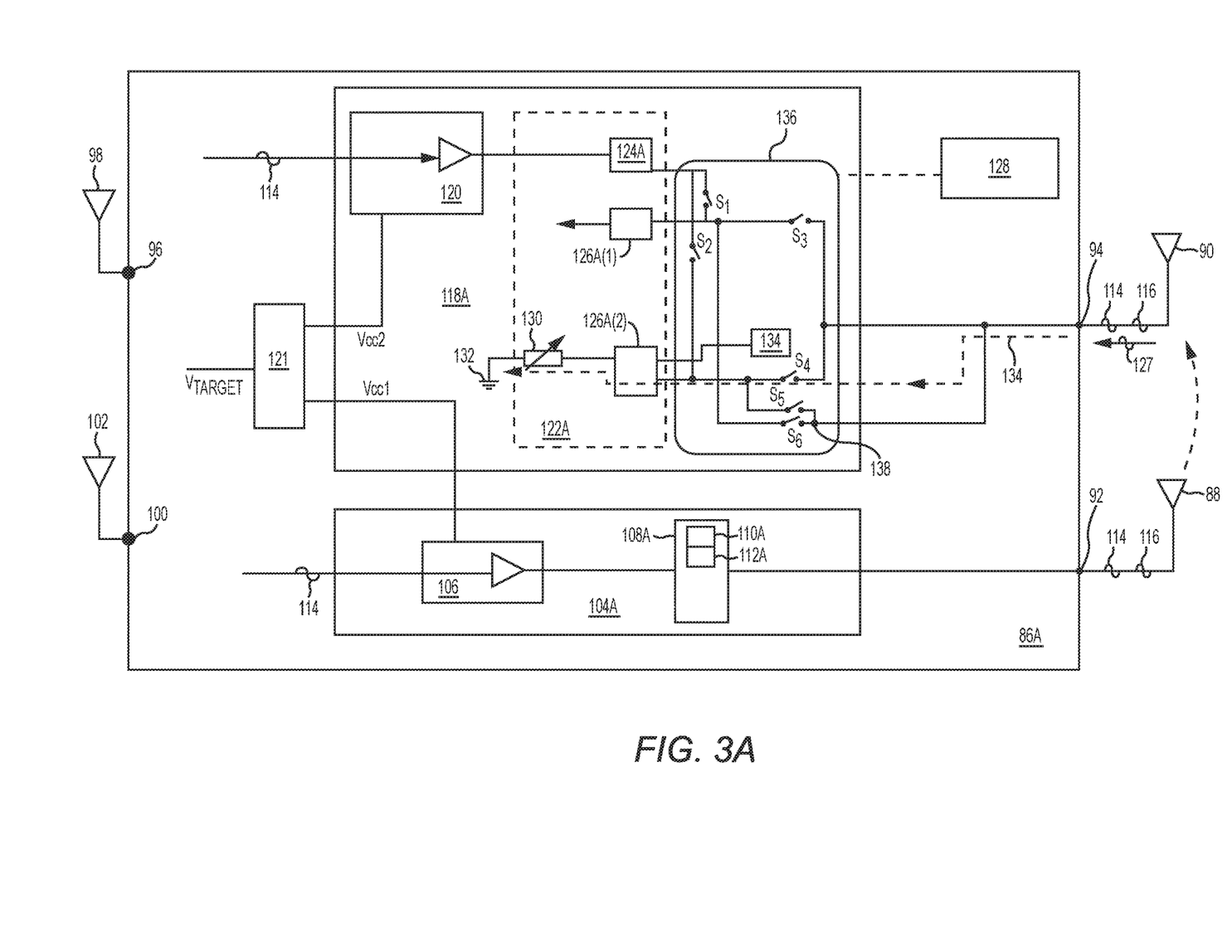
FIG. 3A is a schematic diagram of a multi-band RF front-end circuit configured to suppress an interference signal presented at the second antenna of FIG. 2 in an RF spectrum between 1850-1915 MHz.

In one embodiment, the control circuitry 128 can expand the bandpass bandwidth of an LTE downlink band 3 (1805-1880 MHz) receive filter among the receive filters 126(1)-126(N) to help suppress the interference signal 127 presented at the second antenna port 94 in the RF spectrum of 1850-1915 MHz. In this regard, FIG. 3A is a schematic diagram of a multi-band RF front-end circuit 86A configured to suppress the interference signal 127 of FIG. 2 presented at the second antenna 90 in the RF spectrum of 1850-1915 MHz. Common elements between FIGS. 2 and 3A are shown therein with common element numbers and will not be re-described herein.

The multi-band RF front-end circuit 86A includes first RF circuitry 104A. The first RF circuitry 104A includes first filter circuitry 108A. In a non-limiting example, the first filter circuitry 108A includes an LTE band 25 transmit filter 110A and an LTE band 25 primary receive filter 112A. The multi-band RF front-end circuit 86A includes second RF circuitry 118A. The second RF circuitry 118A includes second filter circuitry 122A. In a non-limiting example, the second filter circuitry 122A includes an LTE band 3 transmit filter 124A, an LTE band 25 receive filter 126A(1), and an LTE band 3 receive filter 126A(2).

In the first filter circuitry 108A, the LTE band 25 transmit filter 110A is configured to pass the RF transmit signal 114 to the first antenna port 92 for transmission via the first antenna 88 in the LTE uplink band 25 (1850-1915 MHz). The LTE band 25 primary receive filter 112A is configured to pass the RF receive signal 116 in the LTE downlink band 25 (1930-1995 MHz).

When the LTE band 25 transmit filter 110A passes the RF transmit signal 114 to the first antenna port 92 for transmission via the first antenna 88 in the LTE uplink band 25, the primary LTE band 25 receive filter 112A and the LTE band 25 receive filter 126A(1) concurrently receive the RF receive signal 116 in the LTE downlink band 25. Given that there may be insufficient spatial separation between the first antenna 88 and the second antenna 90, the RF transmit signal 114 transmitted from the first antenna 88 may be received by the second antenna 90 as the interference signal 127 in an RF spectrum corresponding to the LTE uplink band 25 (1805-1915 MHz). The presence of the interference signal 127 may change the antenna loading and/or frequency response of the second antenna 90, thus causing the second antenna 90 to experience degraded performance when receiving the RF receive signal 116 in the LTE downlink band 25.

In the second filter circuitry 122A, the LTE band 25 receive filter 126A(1) is configured to pass the RF receive signal 116 in the LTE downlink band 25 (1930-1995 MHz). In this regard, the LTE band 25 receive filter 126A(1) functions as a diversity receive filter in the LTE downlink band 25.

In certain usage scenarios, it may not be necessary for the second antenna 90 to transmit the RF transmit signal 114 concurrently in the LTE uplink band 3. Accordingly, the LTE band 3 transmit filter 124A would not be used to pass the RF transmit signal 114 in the LTE uplink band 3 and the LTE band 3 receive filter 126A(2) would not be used to receive the RF receive signal 116 in the LTE downlink band 3 (1805-1880 MHz). As such, the LTE band 3 receive filter 126A(2) becomes an unused receive filter in the second filter circuitry 122A. Hence, it is possible to opportunistically reconfigure the LTE band 3 receive filter 126A(2) as the selected receive filter to help suppress the interference signal 127 presented at the second antenna port 94.

In this regard, the control circuitry 128 may expand bandpass bandwidth of the LTE band 3 receive filter 126A(2) from 1805-1880 MHz to between approximately 1805 MHz (e.g., 1805±1 MHz) and approximately 1915 MHz (e.g., 1915±1 MHz). The expanded bandpass bandwidth of the LTE band 3 receive filter 126A(2) includes an entirety of the RF spectrum (1850-1915 MHz) of the interference signal 127. In this regard, the expanded bandpass bandwidth of the LTE band 3 receive filter 126A(2) is between 1805-1915 MHz. As a result, the LTE band 3 receive filter 126A(2) is reconfigured to pass both the RF receive signal 116 in the LTE downlink band 3 and the interference signal 127 in the RF spectrum of 1850-1915 MHz.

The control circuitry 128 may couple the LTE band 3 receive filter 126A(2) to the second antenna port 94 by closing switch $S_5$. The LTE band 3 receive filter 126A(2) may be coupled to the second antenna port 94 via an impedance control port 138. Accordingly, the control circuitry 128 may adjust the input impedance 130 via the impedance control port 138. The control circuitry 128 can reduce the input impedance 130 to below the predefined low impedance threshold (e.g., approximately zero impedance). As a result, the interference signal path 134 is turned into a low impedance path to shunt the interference signal 127 from the second antenna port 94 to the ground 132. By shunting the interference signal 127 to the ground 132 through the LTE band 3 receive filter 126A(2), it is possible to mitigate impact of the interference signal 127, thus helping to improve RF performance of the second antenna 90 and the multi-band RF front-end circuit 86A as a whole.

In some other usage scenarios, it may be necessary for the second antenna 90 to transmit the RF transmit signal 114 in the LTE uplink band 3. In a non-limiting example, the control circuitry 128 can couple the LTE band 3 transmit filter 124A to the second antenna port 94 by closing switches $S_1$ and $S_3$.

Accordingly, the LTE band 3 transmit filter 124A would be used to pass the RF transmit signal 114 in the LTE uplink band 3 and the LTE band 3 receive filter 126A(2) would be used to receive the RF receive signal 116 in the LTE downlink band 3 (1805-1880 MHz). In this regard, the LTE band 3 receive filter 126A(2) cannot be used to form the interference signal path 134 to shunt the interference signal 127. Accordingly, the control circuitry 128 may open switch $S_5$ to decouple the LTE band 3 receive filter 126A(2) from the impedance control port 138. Further, the control circuitry 128 may close switch $S_4$ to couple the LTE band 3 receive filter 126A(2) directly to the second antenna port 94 to receive the RF receive signal 116 in the LTE downlink band 3. Alternatively, the control circuitry 128 may keep the switch $S_5$ closed, but increase the input impedance 130 above the predefined high impedance threshold to make the interference signal path 134 a high impedance path such that the interference signal 127 cannot be shunted to the ground 132 through the LTE band 3 receive filter 126A(2).

Figure 3B:
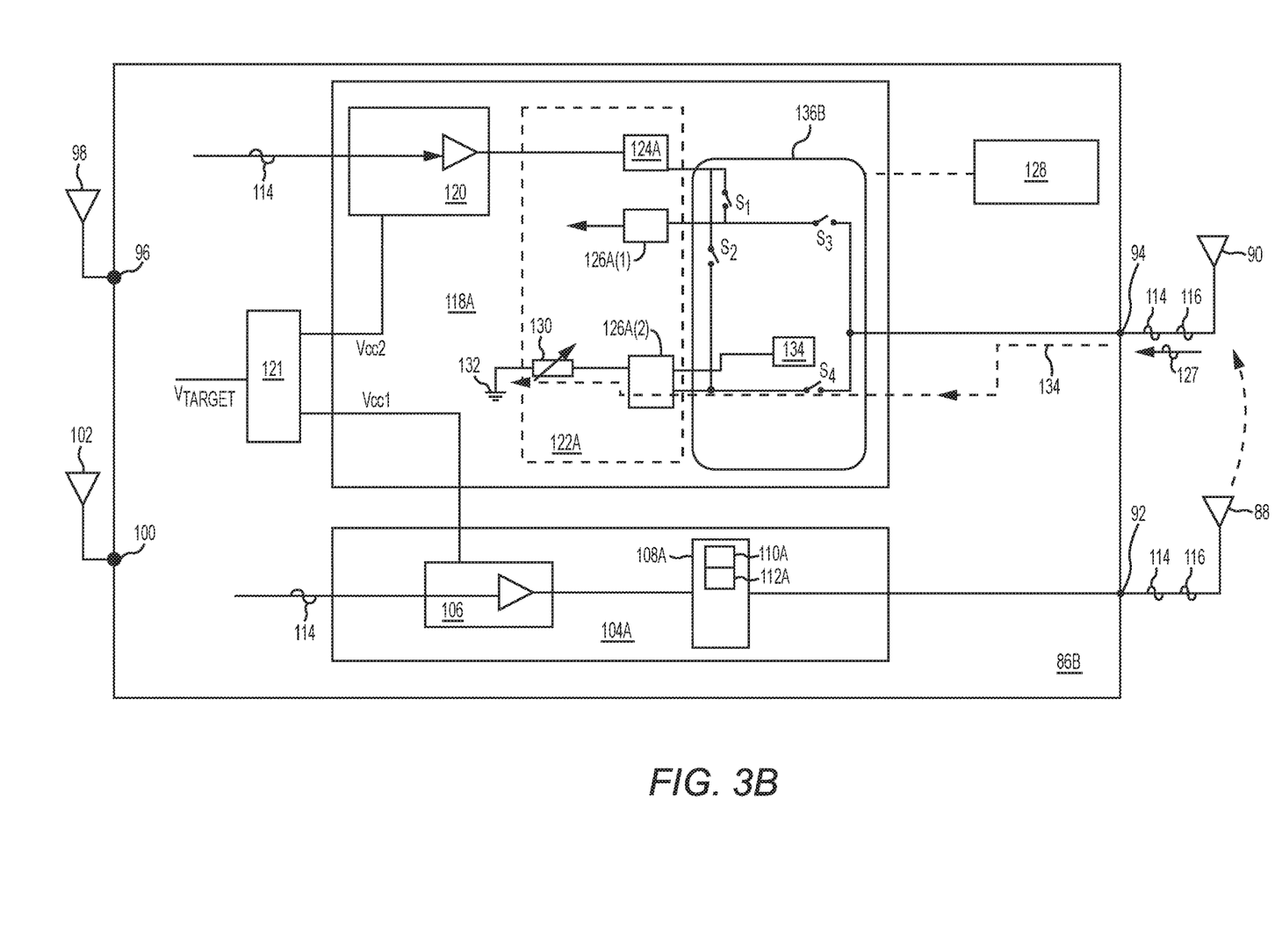
FIG. 3B is a schematic diagram of an exemplary multi-band RF front-end circuit according to an alternative embodiment to the multi-band RF front-end circuit of FIG. 3A.

Alternatively to coupling the LTE band 3 receive filter 126A(2) to the second antenna port 94 via the impedance control port 138, it is possible to simplify the switching circuitry 136 by coupling the LTE band 3 receive filter 126A(2) directly to the second antenna port 94. In this regard, FIG. 3B is a schematic diagram of an exemplary multi-band RF front-end circuit 86B according to an alternative embodiment to the multi-band RF front-end circuit 86A of FIG. 3A. Common elements between FIGS. 2, 3A, and 3B are shown therein with common element numbers and will not be re-described herein.

The multi-band RF front-end circuit 86B includes switching circuitry 136B, which includes switches $S_1$-$S_4$. In this regard, the control circuitry 128 closes switch $S_4$ to couple the LTE band 3 receive filter 126A(2) to the second antenna port 94. In this regard, to form the interference signal path 134 through the LTE band 3 receive filter 126A(2) when the LTE band 3 receive filter 126A(2) is unused, the control circuitry 128 reduces the input impedance 130 to below the predefined low impedance threshold. In contrast, the control circuitry 128 increases the input impedance to above the predefined high impedance threshold to tear down the interference signal path 134.

Figure 4A:
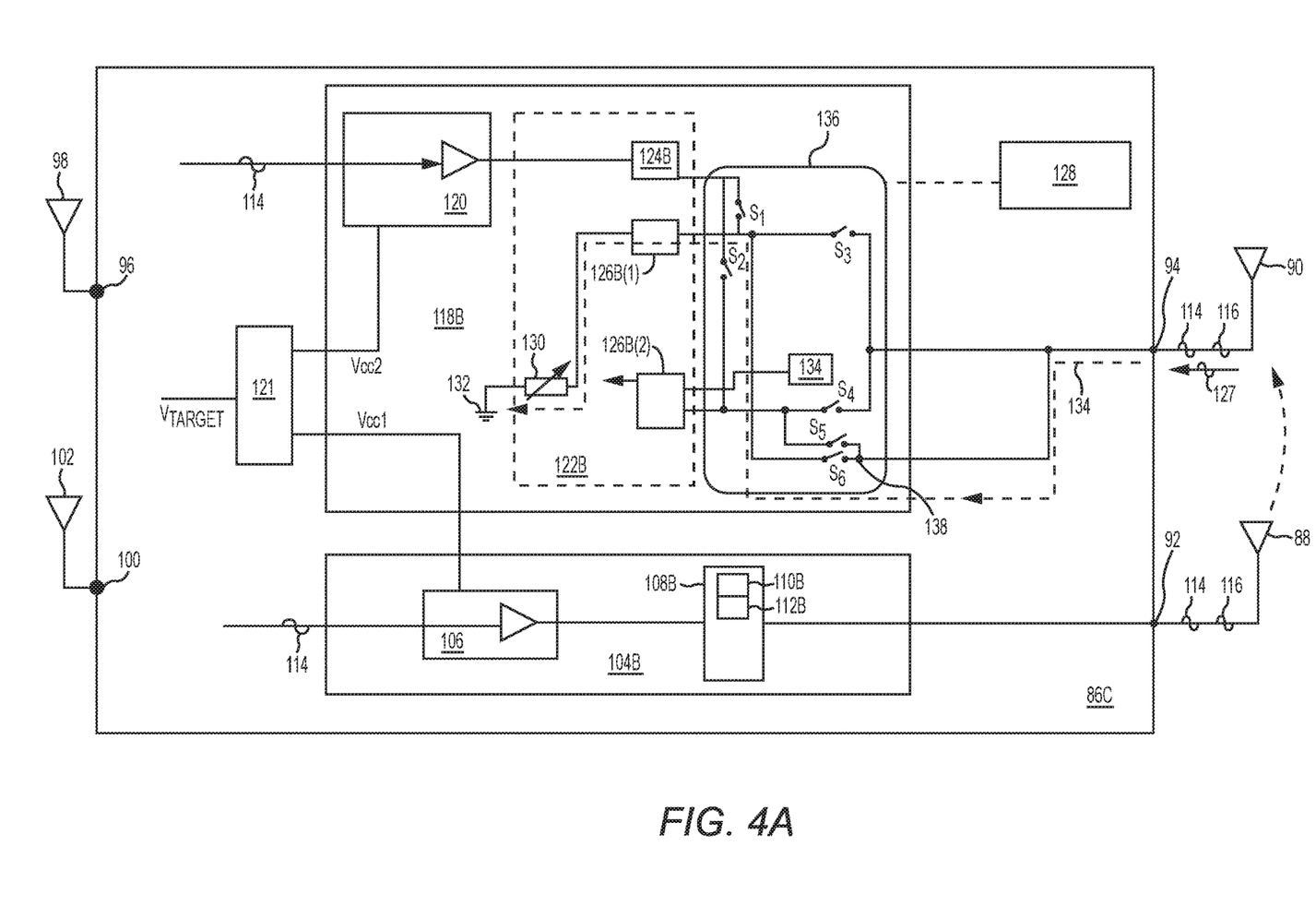
FIG. 4A is a schematic diagram of a multi-band RF front-end circuit configured to suppress an interference signal presented at the second antenna of FIG. 2 in an RF spectrum between 1920-1980 MH.

In another embodiment, the control circuitry 128 can expand the bandpass bandwidth of an LTE downlink band 25 (1930-1995 MHz) receive filter among the receive filters 126(1)-126(N) of FIG. 2 to help suppress the interference signal 127 presented at the second antenna port 94 in the RF spectrum of 1920-1980 MHz. In this regard, FIG. 4A is a schematic diagram of a multi-band RF front-end circuit 86C configured to suppress the interference signal 127 of FIG. 2 presented at the second antenna 90 in the RF spectrum of 1930-1995 MHz. Common elements between FIGS. 2, 3A, and 4A are shown therein with common element numbers and will not be re-described herein.

The multi-band RF front-end circuit 86C includes first RF circuitry 104B. The first RF circuitry 104B includes first filter circuitry 108B. In a non-limiting example, the first filter circuitry 108B includes an LTE band 1 transmit filter 110B and an LTE band 1 primary receive filter 112B. The multi-band RF front-end circuit 86C includes second RF circuitry 118B. The second RF circuitry 118B includes second filter circuitry 122B. In a non-limiting example, the second filter circuitry 122B includes an LTE band 25 transmit filter 124B, an LTE band 25 receive filter 126B(1), and an LTE band 1 receive filter 1266(2).

In the first filter circuitry 108B, the LTE band 1 transmit filter 110B is configured to pass the RF transmit signal 114 to the first antenna port 92 for transmission via the first antenna 88 in the LTE uplink band 1 (1920-1980 MHz). The LTE band 1 primary receive filter 112B is configured to pass the RF receive signal 116 in the LTE downlink band 1 (2110-2170 MHz).

When the LTE band 1 transmit filter 110B passes the RF transmit signal 114 to the first antenna port 92 for transmission via the first antenna 88 in the LTE uplink band 1, the primary LTE band 1 receive filter 112B and the LTE band 1 receive filter 126B(2) concurrently receive the RF receive signal 116 in the LTE downlink band 1. Given that there may be insufficient spatial separation between the first antenna 88 and the second antenna 90, the RF transmit signal 114 transmitted from the first antenna 88 may be received by the second antenna 90 as the interference signal 127 in an RF spectrum corresponding to the LTE uplink band 1 (1920-1980 MHz). The presence of the interference signal 127 may change the antenna loading and/or frequency response of the second antenna 90, thus causing the second antenna 90 to experience degraded performance when receiving the RF receive signal 116 in the LTE downlink band 1.

In the second filter circuitry 122B, the LTE band 1 receive filter 1266(2) is configured to pass the RF receive signal 116 in the LTE downlink band 1 (2110-2170 MHz). In this regard, the LTE band 1 receive filter 1266(2) functions as a diversity receive filter in the LTE downlink band 1.

In certain usage scenarios, it may not be necessary for the second antenna 90 to transmit the RF transmit signal 114 concurrently in the LTE uplink band 25. Accordingly, the LTE band 25 transmit filter 124B would not be used to pass the RF transmit signal 114 in the LTE uplink band 25 and the LTE band 25 receive filter 1266(1) would not be used to receive the RF receive signal 116 in the LTE downlink band 25 (1930-1995 MHz). As such, the LTE band 25 receive filter 1266(1) becomes an unused receive filter in the second filter circuitry 122B. Hence, it is possible to opportunistically reconfigure the LTE band 25 receive filter 1266(1) as the selected receive filter to help suppress the interference signal 127 presented the second antenna port 94.

In this regard, the control circuitry 128 may expand bandpass bandwidth of the LTE band 25 receive filter 1266(1) from 1930-1995 MHz to between approximately 1920 MHz (e.g., 1920 MHz±1 MHz) and approximately 1995 MHz (e.g., 1995 MHz±1 MHz). The expanded bandpass bandwidth of the LTE band 25 receive filter 1266(1) includes an entirety of the RF spectrum (1920-1980 MHz) of interference signal 127. In this regard, the expanded bandpass bandwidth of the LTE band 25 receive filter 1266(1) is between approximately 1920-1995 MHz. As a result, the LTE band 25 receive filter 1266(1) is reconfigured to pass both the RF receive signal 116 in the LTE downlink band 25 and the interference signal 127 in the RF spectrum of 1920-1980 MHz.

The control circuitry 128 may couple the LTE band 25 receive filter 1266(1) to the second antenna port 94 by closing switch S$_6$. The LTE band 25 receive filter 1266(1) may be coupled to the second antenna port 94 via the impedance control port 138. Accordingly, the control circuitry 128 may adjust the input impedance 130 via the impedance control port 138. The control circuitry 128 can reduce the input impedance 130 to below the predefined low impedance threshold (e.g., approximately zero impedance). As a result, the interference signal path 134 is turned into a low impedance path to shunt the interference signal 127 from the second antenna port 94 to the ground 132. By shunting the interference signal 127 to the ground 132 through the LTE band 25 receive filter 1266(1), it is possible to mitigate impact of the interference signal 127, thus helping to improve RF performance of the second antenna 90 and the multi-band RF front-end circuit 86C as a whole.

In some other usage scenarios, it may be necessary for the second antenna 90 to transmit the RF transmit signal 114 in the LTE uplink band 25. In a non-limiting example, the control circuitry 128 can couple the LTE band 25 transmit filter 124B to the second antenna port 94 by closing switches S$_1$ and S$_3$.

Accordingly, the LTE band 25 transmit filter 124B would be used to pass the RF transmit signal 114 in the LTE uplink band 25 and the LTE band 25 receive filter 1266(1) would be used to receive the RF receive signal 116 in the LTE downlink band 25 (1930-1995 MHz). In this regard, the LTE band 25 receive filter 126B(1) cannot be used to form the interference signal path 134 to shunt the interference signal 127. Accordingly, the control circuitry 128 may open switch S$_6$ to decouple the LTE band 25 receive filter 1266(1) from the impedance control port 138. Further, the control circuitry 128 may close switch S$_3$ to couple the LTE band 25 receive filter 1266(1) directly to the second antenna port 94 to receive the RF receive signal 116 in the LTE downlink band 25. Alternatively, the control circuitry 128 may keep the switch S$_6$ closed, but increase the input impedance 130 above the predefined high impedance threshold to make the interference signal path 134 a high impedance path such that the interference signal 127 cannot be shunted to the ground 132 through the LTE band 25 receive filter 1266(1).

Figure 4B:
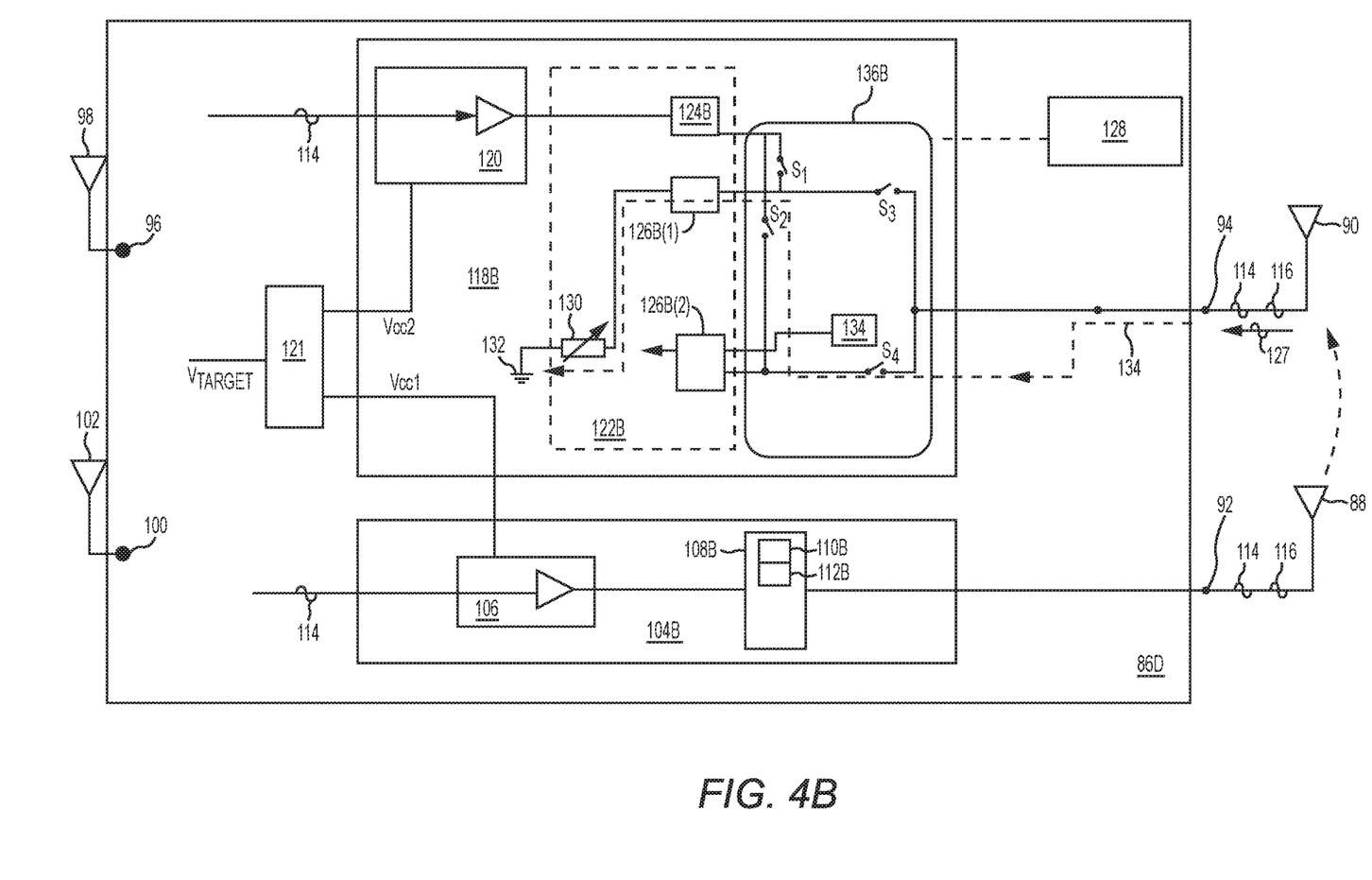
FIG. 4B is a schematic diagram of an exemplary multi-band RF front-end circuit according to an alternative embodiment to the multi-band RF front-end circuit of FIG. 4A.

Alternative to coupling the LTE band 25 receive filter 126B(1) to the second antenna port 94 via the impedance control port 138, it is possible to simplify the switching circuitry 136 by coupling the LTE band 25 receive filter 1266(1) directly to the second antenna port 94. In this regard, FIG. 4B is a schematic diagram of an exemplary multi-band RF front-end circuit 86D according to an alternative embodiment to the multi-band RF front-end circuit 86C of FIG. 4A. Common elements between FIGS. 2, 3A, 3B, 4A, and 4B are shown therein with common element numbers and will not be re-described herein.

The control circuitry 128 closes switch S$_3$ to couple the LTE band 25 receive filter 1266(1) to the second antenna port 94. In this regard, to form the interference signal path 134 through the LTE band 25 receive filter 1266(1) when the LTE band 25 receive filter 1266(1) is unused, the control circuitry 128 reduces the input impedance 130 to below the predefined low impedance threshold. In contrast, the control circuitry 128 increases the input impedance to above the predefined high impedance threshold to tear down the interference signal path 134.

Those skilled in the art will recognize improvements and modifications to the preferred embodiments of the present disclosure. All such improvements and modifications are considered within the scope of the concepts disclosed herein and the claims that follow.

What is claimed is:

1. A multi-band radio frequency (RF) front-end circuit comprising:
   a first antenna port coupled to a first antenna;
   a second antenna port coupled to a second antenna;
   first RF circuitry comprising a first transmit filter configured to pass an RF transmit signal in an RF transmit band;
   second RF circuitry comprising a plurality of receive filters configured to pass an RF receive signal in a plurality of RF receive bands; and
   control circuitry configured to:
      couple the first transmit filter to the first antenna port to transmit the RF transmit signal in the RF transmit band, wherein the RF transmit signal transmitted from the first antenna port is presented at the second antenna port as an interference signal in the RF transmit band;
      expand a bandpass bandwidth of a selected receive filter among the plurality of receive filters to include at least a portion of the RF transmit band;
      couple the selected receive filter between the second antenna port and an input impedance to form an interference signal path from the second antenna port to a ground; and
      adjust the input impedance to shunt the interference signal from the second antenna port to the ground.

2. The multi-band RF front-end circuit of claim 1 wherein:
   the selected receive filter is coupled to the second antenna port via an impedance control port; and
   the control circuitry is further configured to adjust the input impedance via the impedance control port.

3. The multi-band RF front-end circuit of claim 1 wherein the control circuitry is further configured to expand the bandpass bandwidth of the selected receive filter to include an entirety of the RF transmit band.

4. The multi-band RF front-end circuit of claim 1 wherein at least one of the plurality of receive filters different from the selected receive filter among the plurality of receive filters is configured to receive the RF receive signal in at least one of the plurality of RF receive bands.

5. The multi-band RF front-end circuit of claim 1 wherein the control circuitry is further configured to reduce the input impedance coupled to the selected receive filter when the selected receive filter is not configured to receive the RF receive signal such that the interference signal is shunted through the selected receive filter.

6. The multi-band RF front-end circuit of claim 1 wherein the control circuitry is further configured to decouple the selected receive filter from the second antenna port when the selected receive filter is configured to receive the RF receive signal such that the interference signal is not shunted through the selected receive filter.

7. The multi-band RF front-end circuit of claim 1 wherein the control circuitry is further configured to increase the input impedance coupled to the selected receive filter when the selected receive filter is configured to receive the RF receive signal such that the interference signal is not shunted through the selected receive filter.

8. The multi-band RF front-end circuit of claim 1 wherein:

the first RF circuitry further comprises one or more primary receive filters configured to pass the RF receive signal in one or more primary RF receive bands; and
the second RF circuitry further comprises at least one second transmit filter configured to pass the RF transmit signal in a second RF transmit band different from the RF transmit band.

9. The multi-band RF front-end circuit of claim 8 wherein the second RF transmit band is adjacent to but not overlapping the RF transmit band.

10. The multi-band RF front-end circuit of claim 8 wherein:
the RF transmit band comprises long-term evolution (LTE) uplink band 1 and LTE uplink band 25; and
the second RF transmit band comprises LTE uplink band 3, LTE uplink band 4, and LTE uplink band 66.

11. The multi-band RF front-end circuit of claim 8 wherein the control circuitry is further configured to couple the at least one second transmit filter to the second antenna port to transmit the RF transmit signal in the second RF transmit band.

12. The multi-band RF front-end circuit of claim 1 further comprising switching circuitry provided between the second RF circuitry and the second antenna port.

13. The multi-band RF front-end circuit of claim 12 wherein the control circuitry is further configured to control the switching circuitry to couple the selected receive filter to the second antenna port or to decouple the selected receive filter from the second antenna port.

14. The multi-band RF front-end circuit of claim 1 wherein:
the first RF circuitry comprises a long-term evolution (LTE) band 25 transmit filter configured to pass the RF transmit signal in the LTE uplink band 25;
the second RF circuitry comprises an LTE band 3 receive filter configured to pass the RF receive signal in LTE downlink band 3; and
the control circuitry is further configured to:
expand the bandpass bandwidth of the LTE band 3 receive filter to include at least a portion of the LTE uplink band 25; and
couple the LTE band 3 receive filter between the second antenna port and the input impedance to form the interference signal path to shunt the interference signal from the second antenna port to the ground.

15. The multi-band RF front-end circuit of claim 14 wherein the control circuitry is further configured to expand the bandpass bandwidth of the LTE band 3 receive filter from between 1805 MHz and 1880 MHz to between approximately 1805 MHz and approximately 1915 MHz to include the LTE uplink band 25 ranging from 1850 MHz to 1915 MHz.

16. The multi-band RF front-end circuit of claim 14 wherein:
the second RF circuitry further comprises an LTE band 3 transmit filter configured to pass the RF transmit signal in the LTE uplink band 3;
the LTE band 3 receive filter is configured to receive the RF receive signal in the LTE downlink band 3; and
the control circuitry is further configured to increase the input impedance such that the LTE band 3 receive filter does not shunt the interference signal from the second antenna port to the ground.

17. The multi-band RF front-end circuit of claim 1 wherein:
the first RF circuitry comprises a long-term evolution (LTE) band 1 transmit filter configured to pass the RF transmit signal in LTE uplink band 1;
the second RF circuitry comprises an LTE band 25 receive filter configured to pass the RF receive signal in LTE downlink band 25; and
the control circuitry is further configured to:
expand the bandpass bandwidth of the LTE band 25 receive filter to include at least a portion of the LTE uplink band 1; and
couple the LTE band 25 receive filter between the second antenna port and the input impedance to form the interference signal path to shunt the interference signal from the second antenna port to the ground.

18. The multi-band RF front-end circuit of claim 17 wherein the control circuitry is further configured to expand the bandpass bandwidth of the LTE band 25 receive filter from between 1930 MHz and 1995 MHz to between approximately 1920 MHz and approximately 1995 MHz to include the LTE uplink band 1 ranging from 1920 MHz to 1980 MHz.

19. The multi-band RF front-end circuit of claim 17 wherein:
the second RF circuitry further comprises an LTE band 25 transmit filter configured to pass the RF transmit signal in the LTE uplink band 25;
the LTE band 25 receive filter is configured to receive the RF receive signal in the LTE downlink band 25; and
the control circuitry is further configured to increase the input impedance such that the LTE band 25 receive filter does not shunt the interference signal from the second antenna port to the ground.

20. The multi-band RF front-end circuit of claim 1 further comprising a third antenna port coupled to a third antenna and a fourth antenna port coupled to a fourth antenna.

21. A multi-band radio frequency (RF) front-end circuit comprising:
a first antenna port coupled to a first antenna;
a second antenna port coupled to a second antenna;
first RF circuitry comprising:
a first transmit filter configured to pass an RF transmit signal in an RF transmit band; and
second RF circuitry comprising:
a plurality of receive filters configured to pass an RF receive signal in a plurality of RF receive bands; and
control circuitry configured to:
couple the first transmit filter to the first antenna port to transmit the RF transmit signal in the RF transmit band, wherein the RF transmit signal transmitted from the first antenna port is presented at the second antenna port as an interference signal in the RF transmit band;
expand a bandpass bandwidth of a selected receive filter among the plurality of receive filters to include at least a portion of the RF transmit band;
couple the selected receive filter between the second antenna port and an input impedance to form an interference signal path from the second antenna port to a ground; and
adjust the input impedance to shunt the interference signal from the second antenna port to the ground.

* * * * *

UNITED STATES PATENT AND TRADEMARK OFFICE
CERTIFICATE OF CORRECTION

PATENT NO. : 10,554,232 B2
APPLICATION NO. : 16/149235
DATED : February 4, 2020
INVENTOR(S) : Nadim Khlat et al.

Page 1 of 1

It is certified that error appears in the above-identified patent and that said Letters Patent is hereby corrected as shown below:

In the Specification

Column 14, Lines 11, 37, and 39, replace "1266(2)" with -- 126B(2) --.

Column 14, Line 44, replace "1246" with -- 124B --.

Column 14, Lines 46, 49, 51, 56, 59, 62, 64, replace "1266(1)" with -- 126B(1) --.

Column 15, Lines 2, 3, 14, 27, 33, 36, 44, 49, 57, 59, and 60, replace "1266(1)" with -- 126B(1) --.

Signed and Sealed this
Thirty-first Day of March, 2020

Andrei Iancu
*Director of the United States Patent and Trademark Office*